(12) United States Patent
Kurian et al.

(10) Patent No.: US 10,579,511 B2
(45) Date of Patent: Mar. 3, 2020

(54) FLEXIBLE TESTING ENVIRONMENT USING A CLOUD INFRASTRUCTURE—CLOUD TECHNOLOGY

(71) Applicant: Bank of America Corporation, Charlotte, NC (US)

(72) Inventors: Manu J. Kurian, Dallas, TX (US); James Heddleson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 66 days.

(21) Appl. No.: 15/591,279

(22) Filed: May 10, 2017

(65) Prior Publication Data

US 2018/0329805 A1 Nov. 15, 2018

(51) Int. Cl.
| | |
|---|---|
| G06F 9/44 | (2018.01) |
| G06F 11/36 | (2006.01) |
| G06F 9/50 | (2006.01) |

(52) U.S. Cl.
CPC ........ *G06F 11/3672* (2013.01); *G06F 9/5005* (2013.01)

(58) Field of Classification Search
None
See application file for complete search history.

(56) References Cited

U.S. PATENT DOCUMENTS

| | | | |
|---|---|---|---|
| 8,285,681 B2 | 10/2012 | Prahlad et al. | |
| 8,341,462 B2 | 12/2012 | Broda et al. | |
| 8,510,600 B2 | 8/2013 | Broda et al. | |
| 8,527,549 B2 | 9/2013 | Cidon | |
| 8,615,589 B1 * | 12/2013 | Adogla | G06F 9/5077 709/226 |
| 8,762,642 B2 | 6/2014 | Bates et al. | |
| 8,788,628 B1 | 7/2014 | Taylor et al. | |
| 8,805,951 B1 | 8/2014 | Faibish et al. | |
| 8,805,968 B2 | 8/2014 | Taylor et al. | |
| 8,819,490 B2 | 8/2014 | Li et al. | |
| 8,832,820 B2 | 9/2014 | Barjatiya et al. | |
| 8,850,130 B1 | 9/2014 | Aron et al. | |
| 9,147,195 B2 | 9/2015 | Sivaramakrishnan et al. | |
| 9,256,374 B1 | 2/2016 | Aron et al. | |

(Continued)

OTHER PUBLICATIONS

Franz Freidrich Lieginger Portela, https://www.ibm.com/blogs/cloud-computing/2013/08/metadata-scanning-and-security-in-the-cloud/.

(Continued)

*Primary Examiner* — Insun Kang
(74) *Attorney, Agent, or Firm* — Michael A. Springs (57) ABSTRACT

A flexible testing environment may include requesting an allocation of resources and testing characteristics of a project, verifying the testing characteristics, registering the project for testing, determining whether resources can be allocated for testing based on the testing characteristics and available resources, and allocating resources based on the testing characteristics and available resources. During testing of the project, the system may receive changes to the testing characteristics of the project, thereby causing adjustments to the allocated resources based on the updated testing characteristics. In certain embodiments, testing characteristics may closely approximate the resources employed by the project in a live production environment.

17 Claims, 2 Drawing Sheets

(56) References Cited

U.S. PATENT DOCUMENTS

| | | | |
|---|---|---|---|
| 9,336,118 | B2 | 5/2016 | Oh et al. |
| 9,398,087 | B1 | 7/2016 | Hosie et al. |
| 9,419,857 | B1* | 8/2016 | Ryan ................ H04L 63/08 |
| 9,424,437 | B1 | 8/2016 | Ancin et al. |
| 9,454,398 | B2 | 9/2016 | Hacker |
| 9,565,200 | B2 | 2/2017 | Bacastow et al. |
| 9,645,852 | B2* | 5/2017 | Anderson ........... G06F 9/5011 |
| 9,923,955 | B2* | 3/2018 | Chan .................. H04L 67/10 |
| 2007/0061626 | A1* | 3/2007 | Nelson ............ G06F 11/3688 |
| | | | 714/38.14 |
| 2008/0244576 | A1* | 10/2008 | Kwon ................. G06F 9/5016 |
| | | | 718/1 |
| 2010/0064043 | A1* | 3/2010 | Iino .................... G06F 9/468 |
| | | | 709/226 |
| 2010/0332456 | A1* | 12/2010 | Prahlad ......... G06F 17/30082 |
| | | | 707/664 |
| 2012/0185913 | A1* | 7/2012 | Martinez ............ G06F 9/455 |
| | | | 726/1 |
| 2012/0254410 | A1* | 10/2012 | Lee .................... G06F 9/5061 |
| | | | 709/224 |
| 2013/0173597 | A1* | 7/2013 | Do .................... G06F 9/5011 |
| | | | 707/722 |
| 2013/0305210 | A1* | 11/2013 | Sharma ............. G06Q 10/06 |
| | | | 717/102 |
| 2014/0026119 | A1* | 1/2014 | DeJana ............. G06F 8/20 |
| | | | 717/124 |
| 2014/0026122 | A1* | 1/2014 | Markande ....... G06F 11/3664 |
| | | | 717/124 |
| 2014/0068600 | A1* | 3/2014 | Ashok ............. G06F 9/45558 |
| | | | 718/1 |
| 2014/0089887 | A1* | 3/2014 | Bhattacharyya ..... G06Q 10/06 |
| | | | 717/102 |
| 2015/0172205 | A1* | 6/2015 | Anderson ........... H04L 47/70 |
| | | | 709/224 |
| 2015/0242294 | A1* | 8/2015 | Lapierre ........... G06F 11/079 |
| | | | 714/37 |
| 2015/0254090 | A1* | 9/2015 | Mandava ......... G06F 9/45558 |
| | | | 718/1 |
| 2015/0261658 | A1* | 9/2015 | Douglas .......... G06F 11/3688 |
| | | | 714/38.1 |
| 2015/0269062 | A1* | 9/2015 | Sharda .......... G06F 11/3664 |
| | | | 714/38.1 |
| 2016/0050108 | A1* | 2/2016 | Baughman ......... H04L 41/083 |
| | | | 709/220 |
| 2016/0321115 | A1* | 11/2016 | Thorpe ............ H04L 47/823 |
| 2016/0371069 | A1* | 12/2016 | Bae .................. G06F 8/60 |
| 2017/0039218 | A1 | 2/2017 | Prahlad et al. |
| 2017/0093684 | A1 | 3/2017 | Jayaraman et al. |
| 2017/0093962 | A1* | 3/2017 | Player ............. H04L 41/20 |
| 2017/0149681 | A1* | 5/2017 | Chen .............. H04L 41/12 |
| 2017/0315902 | A1* | 11/2017 | Moretto .......... G06F 11/3672 |
| 2018/0074932 | A1* | 3/2018 | Baughman ......... H04L 41/083 |
| 2018/0181383 | A1* | 6/2018 | Jagannath ........ G06F 9/50 |
| 2018/0183864 | A1* | 6/2018 | Bender ........... H04L 47/765 |

OTHER PUBLICATIONS https://books.google.com/books?id=OOKWBQAAQBAJ&pg=PA27&lpg=PA27&dq=Metadata+tagging+data+within+a+cloud+environment&source=bl&ots=ViMbGig5Bz&sig=ZkRS0aghcp-zUxBB7u8nLRD7uBk&hl=en&sa=X&ved=0ahUKEwjT0euM-PbSAhUkzIMKHcKrDF0Q6AEISDAJ#v=onepage&q=Metadata%20tagg; Jaydip Sen, Chapter 1 entitled "Security and Privacy Issues in Cloud Computing", Copyright 2014; pp. 1-45.

* cited by examiner

FLEXIBLE TESTING ENVIRONMENT USING A CLOUD INFRASTRUCTURE—CLOUD TECHNOLOGY

TECHNICAL FIELD

The present disclosure relates to a flexible testing environment, and more particularly to a flexible testing environment using a cloud infrastructure.

BACKGROUND

Many development cycles incorporate testing projects before they are fully deployed into a live setting, such as a commercial environment. Development environments often are limited for testing because the resources available may not accurately reflect the live production environment. In addition, development environments may have a fixed amount of resources available for testing that is not flexible or scalable depending on the volume of projects requiring testing or the nature of any particular testing. To facilitate flexible testing, systems and methods may be provided to permit scalable testing, and in appropriate cases, provide a testing environment that simulates the production environment.

SUMMARY OF THE DISCLOSURE

In accordance with the present disclosure, a system for a flexible testing environment using a cloud infrastructure is provided which substantially eliminates or reduces disadvantages and problems associated with previous systems and methods. According to a particular embodiment, implementing a flexible testing environment may include receiving a request to allocate testing resources for a project and testing characteristics for the project, verifying the testing characteristics of the project, registering the project for testing using the verified testing characteristics, determining whether testing resources can be allocated based on the testing characteristics of the project and the available testing resources, and allocating testing resources based on the testing characteristics of the project and available resources. In particular embodiments, after testing of the project initiates using the allocated testing resources, the system may receive changes to the testing characteristics of the project and cause testing characteristics of the project to be updated. Certain embodiments may adjust the allocated testing resources based on the updated testing characteristics of the project. In some embodiments, the testing characteristics of a project may include a plurality of stages of testing where each stage of the plurality of stages is defined by the duration of testing and the amount of computing resources required for testing during each stage. In particular implementations, the testing characteristics of the project or requested allocation of testing resources may include a an amount of computing resources for testing that closely approximates the amount of resources found in a production environment for the project.

Particular embodiments provide various technical advantages that overcome specific technical problems inherent to cloud computing and internet technology. In particular, the present disclosure provides a flexible framework that overcomes the conventional restrictions inherent to preexisting cloud environments. Specifically, conventional cloud computing systems are inherently rigid in their inability to scale to the needs of particular projects, and dynamically address the changing volume or projects being handled by the system at the same time. In addition, conventional cloud testing environments could not adjust testing resources in response to changing needs during a testing cycle, and further were inherently unable to request additional resources when available resources were limited. As a result, those conventional systems introduced delay in the development cycle of a single project or a series of projects having overlapping project development cycles. Embodiments of the present disclosure specifically overcome these problems inherent to inflexible testing environments that may contribute to delays in development and production because they provide a scalable, flexible testing environment using cloud infrastructure to override routine functionality of conventional testing regimes. In addition, certain embodiments of the present disclosure implement a dynamic allocation of testing resources that can adapt to the changing testing needs of one or more projects even where those projects have disparate project development schedules and testing requirements. As a result, techniques of the present disclosure provide specific solutions rooted in technology to overcome a problem arising in the realm of testing environments.

The unconventional and non-generic arrangement of components of embodiments of the present disclosure provide a technological solution to overcome the shortcomings of conventional testing environments. Embodiments of the present invention may permit the testing environment to dynamically adjust the allocation of testing resources during a testing cycle of one or more projects. The adjustment of the allocation of testing resources enables the testing environment to conserve limited testing resources and reallocate unused resources to other projects. This results in efficient use of resources and minimizes the disproportionate impact of a small number of projects reserving the vast majority of testing resources when those may not need such a large allocation during the entire testing cycle of each project. Certain embodiments may also enable a testing environment to request resources from other data servers, including proprietary or third party servers, if requests for testing resources exceeds the testing resources available to the testing environment. For example, in particular implementations, dormant data servers may be activated to provide additional resources for the testing environment.

Certain embodiments of the present disclosure facilitate the testing of the projects under conditions similar to production environments for which the projects are being designed. Given that production environments may involve the use of a large amount or number of computing resources, a conventional testing environment may not always be able to provide the same scale of testing resources to troubleshoot or evaluate a project before its final release, particularly when testing resources are shared by other projects. Techniques of the present disclosure overcome these shortcomings of conventional systems by dynamically managing the allocation of testing resources such that testing resources are not only shared but also are available on-demand to individual projects to be tested under conditions approaching a live production environment. Thus, techniques of the present disclosure provide a technological solution that overrides the operation of conventional inflexible testing environments that were not suited to share resources while also enabling testing on resources that sufficiently modeled those available in the final production environment.

Thus, a flexible framework is disclosed that that may be configured, built and deployed in a network environment to enable flexible testing environment using a cloud infrastructure.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
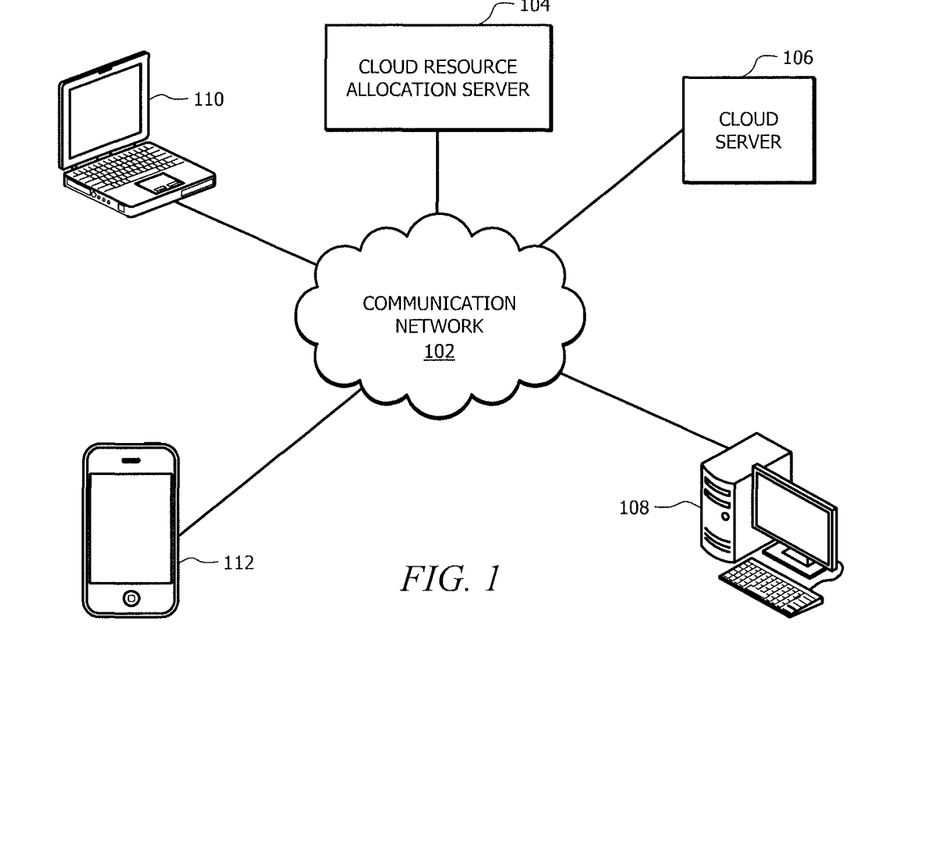
FIG. 1 is a block diagram illustrating a system environment with elements that interoperate to provide a flexible testing environment using a cloud infrastructure.
Figure 2:
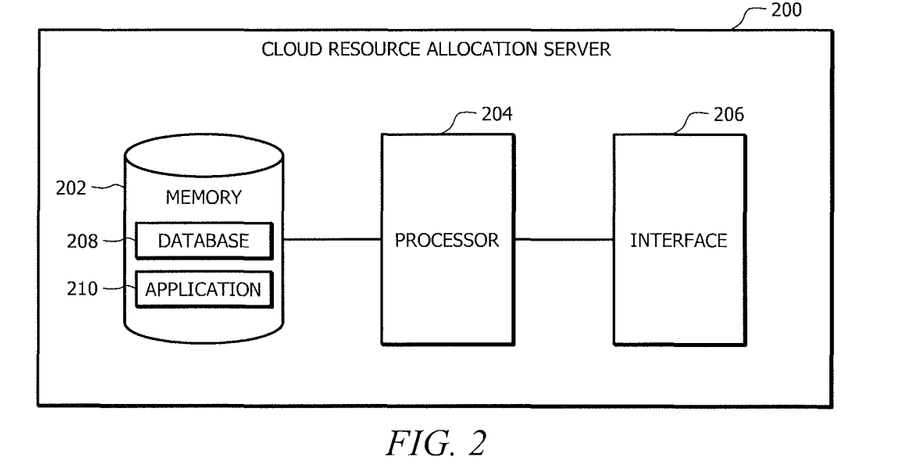
FIG. 2 is a block diagram illustrating an example cloud resource allocation server for performing various aspects of providing a flexible testing environment.
Figure 3:
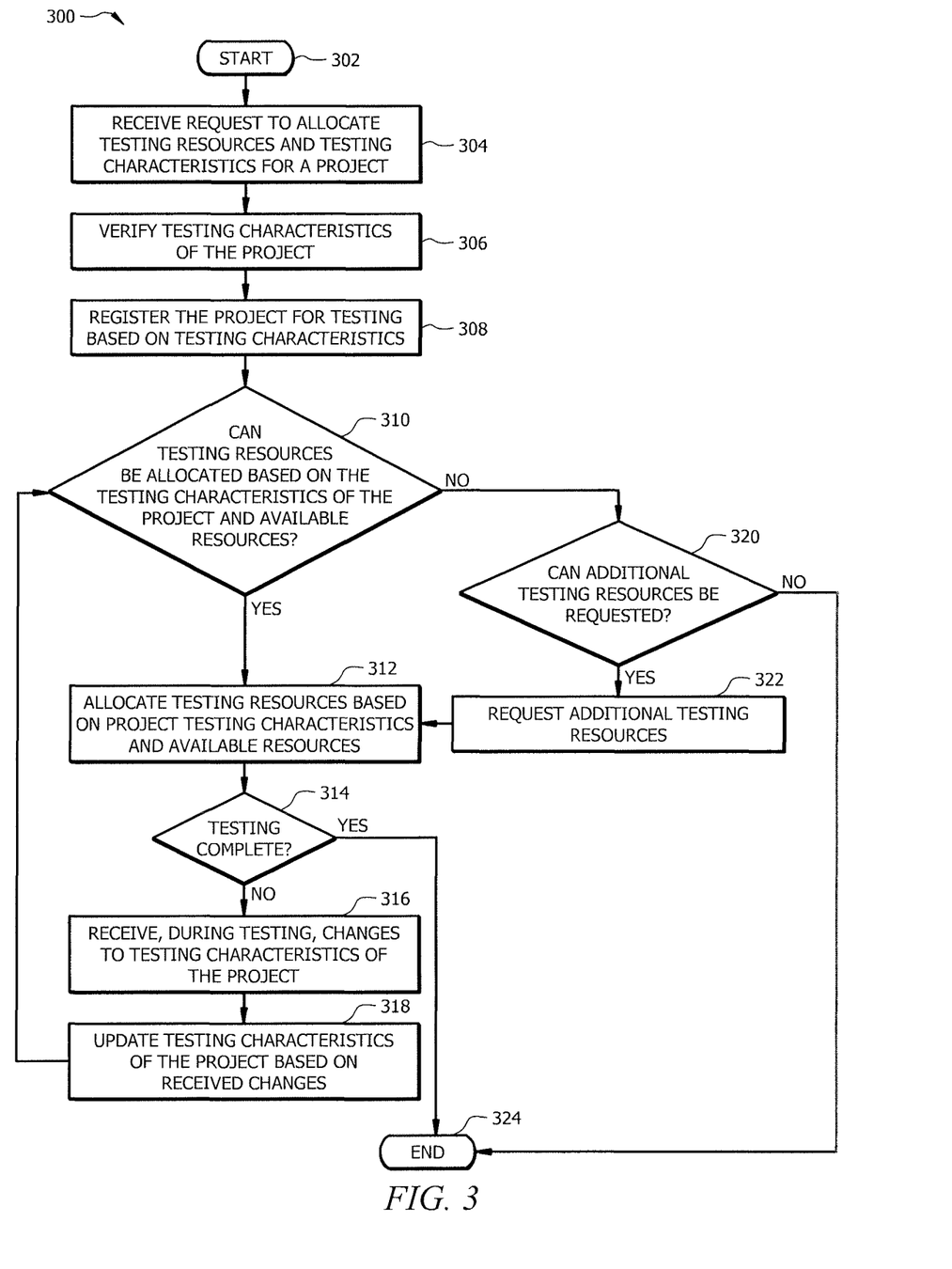
FIG. 3 illustrates an example process flow for providing a flexible testing environment using a cloud infrastructure.

Embodiments of the present disclosure and its advantages are best understood by referring to FIGS. 1-3, like numerals being used for like and corresponding parts of the various drawings.

FIG. 1 is a block diagram illustrating a system 100 with elements that interoperate to provide a flexible testing environment using a cloud infrastructure. The elements of system 100 can support a number of different operations, including receiving a request to allocate testing resources for a project and testing characteristics for the project, verifying the testing characteristics of the project, registering the project for testing using the verified testing characteristics, determining whether testing resources can be allocated based on the testing characteristics of the project and the available testing resources, and allocating testing resources based on the testing characteristics of the project and available resources. In particular embodiments of system 100, after testing of the project initiates using the allocated testing resources, the system may receive changes to the testing characteristics of the project and cause testing characteristics of the project to be updated. In response, certain embodiments may adjust the allocated testing resources based on the updated testing characteristics of the project.

The testing characteristics of a project may include a plurality of stages of testing where each stage of the plurality of stages is defined by the duration of testing in the stage and an amount of resources required for testing during that stage. In some implementations, the testing characteristics of the project or requested allocation of testing resources may include the amount of resources for testing that closely approximates the amount of resources found in a production environment for the project. In some embodiments, some of these tasks may be performed by servers, such as a cloud resource allocation server. In other implementations, these tasks may be performed in a distributed fashion using various components that interface with each other over a network. Embodiments of the present disclosure provide a flexible testing environment over a common network that may be accessible through a variety of network components.

For example, embodiments of the present disclosure may be deployed in an enterprise setting focused on project development and testing. Alternative embodiments of the present disclosure may be publicly accessible, such as through the Internet, as an on-demand service to developers and testers.

In the illustrated embodiment, system 100 includes a number of elements interconnected by one or more networks, represented by communications network 102. Communications network 102 represents communications equipment, including hardware and any appropriate controlling logic, for interconnecting elements and facilitating communication between these elements. Communications network 102 may include local area networks (LANs), metropolitan area networks (MANs), wide area networks (WANs), any other public or private network, local, regional, or global communication network such as the Internet, enterprise intranet, other suitable wired or wireless communication link, or any combination thereof. Communications network 102 may include any combination of gateways, routers, hubs, switches, access points, base stations, and any other hardware, software, or a combination of the preceding that may implement any suitable protocol. Communications network 102 may include other types of networks, including wireless or wired networks. The use of communications network 102 facilitates seamless access to and management of a flexible testing environment regardless of the geographic location or communication protocols employed by network components or devices on the network. While only one communications network 102 has been illustrated, it should be understood that various embodiments may operate using multiple communications networks 102. In addition, various embodiments may employ one or more wired and wireless networks in communications networks 102.

Communications network 102 interconnect other elements of system 100, including cloud resource allocation server 104, cloud server 106, desktop computer 108, laptop computer 110, and mobile device 112. It should be understood that while system 100 is illustrated as including a single communications network connected to specific components, various embodiments may operate using any suitable arrangement and collection of networks and components that enable appropriate communications.

The illustrated embodiment of system 100 also includes a cloud resource allocation server 104 coupled to communications network 102. Cloud resource allocation server 104 represents any appropriate combination of hardware, controlling logic, and data for managing and providing a flexible testing environment using a cloud infrastructure. For example, cloud resource allocation server 104 may represent a networked server or collection of networked servers capable of communicating with other elements of system 100 to communicate with cloud server 106 to dynamically manage testing resources in a flexible testing environment across communications network 102. In particular embodiments, cloud resource allocation server 104 may be accessed by various devices including, for example, by desktop computer 108, laptop computer 110, and mobile device 112, to actively manage and allocate testing resources. As illustrated, cloud resource allocation server 104 couples to communications network 102 to facilitate communication with other elements of system 100. For example, cloud resource allocation server 104 may communicate with and manage resources for testing managed by cloud server 106. In particular embodiments, cloud resource allocation server 104 may operate as a web server or web portal accessible across the communications network 102 by various devices, including desktop computer 108, laptop computer 110, and mobile devices 112.

According to particular implementations, cloud resource allocation server 104 can provide users with an appropriate interface to request allocation of testing resources and specify testing characteristics for specific projects. For example, a software development project may require testing and be submitted by a user (e.g., developer or tester) over communications network 102 through a web portal interface provided by cloud resource allocation server 104. In particular embodiments, the user may be able to provide various testing characteristics, including the number of testing stages, the duration of testing in each stage, and the amount of resources required in each stage. Certain implementations of cloud resource allocation server 104 dynamically allocate shared computing resources for testing multiple projects. In certain implementations, cloud resource allocation server 104 may allocate testing resources to a project that closely simulate the resources available during deployment of the project in a production environment, such as a commercial or live setting. Other embodiments of cloud resource allocation server 104 are capable of facilitating on-demand testing by requesting additional computing resources from other components of system 100, such as could server 106. Similarly, when computing resources are no longer needed for testing, embodiments of cloud resource allocation server 105 may be capable of releasing computing resources so that they be used for other purposes.

Cloud resource allocation server 104 may include memory, processors, databases, and appropriate interfaces to couple to other devices or networks. Particular implementation of cloud resource allocation server 104 may include the use of one or more data servers or mesh computing environments. In certain implementations, cloud resource allocation server 104 may provide a flexible testing environment that dynamically manages computing resources used for testing. In particular embodiments, cloud resource allocation server 104 may include a relational database for storing relevant information associated with the flexible testing environment, including testing characteristics of particular projects, inventory of resources for testing, user information, or other appropriate information related to managing the testing environment. While system 100 depicts a single cloud resource allocation server 104, it should be understood that various embodiments may operate using any number of cloud resource allocation servers. In addition, various embodiments may incorporate the functionality and/or hardware of cloud resource allocation server 104 in other servers (e.g., cloud server 106), computers, or networks. In particular embodiments, cloud resource allocation server 104 would be located on an enterprise or protected network. In certain embodiments, access to cloud resource allocation server 104 may be limited to a private network while in other embodiments cloud resource allocation server 104 may be accessed from a public communication network, such as the Internet.

As illustrated, system 100 includes a cloud server 106 coupled to communications network 102. Cloud server 106 represents any appropriate combination of hardware, controlling logic, and data for providing computing resources that may be used for testing. Cloud server 106 may include memory, processors, databases, and appropriate interfaces to couple to other devices or networks. Particular implementation of cloud server 106 may include the use of one or more data servers or mesh computing environments. For example, cloud server 106 may represent a networked server or collection of networked servers capable of communicating with other elements of system 100 to provide computing resources.

Cloud server 106 may include processors such as central processing units (CPUs) or other suitable processing unit, random access memory (RAM), read only memory (ROM), solid state storage devices, magnetic storage devices, optical storage devices, or any other suitable information storage device or a combination of such devices. Cloud server 106 may include any suitable combination of volatile or non-volatile, local or remote devices suitable for storing and maintaining information. In particular embodiments, cloud server 106 may include a relational database for storing relevant information associated with the flexible testing environment.

In certain embodiments, resources that are made available or accessible by cloud server 106 may include random access memory (RAM), central processing units (CPUs), hard disk memory, input or output (I/O) resources, or any combination thereof. Computing resources provided by cloud server 106 may be managed by other elements of system 100, such as cloud resource allocation server 104. In certain implementations, cloud server 106 may facilitate processing or storage of projects that require testing. For example, the computing resources provided by cloud server 106 may act as a shared pool of testing resources that can be allocated to test applications and projects in a flexible testing environment. In certain embodiments, cloud server 106 may represent one or more proprietary or enterprise data servers. In other embodiments, cloud server 106 may represent one or more third party data servers that operate as a fixed or on-demand cloud service. In those embodiments, the hardware and functionality of cloud server 106 may be provided by third party data servers.

In particular embodiments, cloud server 106 communicates with various devices including, for example, by cloud resource allocation server 104, desktop computer 108, laptop computer 110, and mobile device 112, to perform the operations of the present disclosure. As illustrated, cloud server 106 couples to communications network 102 to facilitate communication with other elements of system 100. For example, cloud server 106 may communicate with and be managed by cloud resource allocation server 104 to provide a flexible testing environment according to embodiments of the present disclosure. In some embodiments, the functionality and resources of cloud server 106 may reside on or be directly coupled to resource allocation servers, such as cloud resource allocation server 104.

While system 100 depicts a single cloud server 106, it should be understood that various embodiments may operate using any number of private cloud servers. In addition, various embodiments may incorporate the functionality and/or hardware of cloud server 106 in other servers, computers, or networks. In particular embodiments, the functionality and hardware of cloud server 106 may be incorporated into or co-located with cloud resource allocation server 104. In certain embodiments, access to cloud server 106 may be limited to a private network while in other embodiments cloud server 106 may be accessed from a public communication network, such as the Internet.

The illustrated embodiment of system 100 also includes endpoint devices including desktop computer 108, laptop computer 110, and mobile device 112 coupled to communications network 102. These devices represent any suitable hardware, including appropriate controlling logic and data, capable of connecting to and communicating over a network. For example, desktop computer 108 may represent a workstation used at an enterprise or a desktop personal computer. Laptop computer 110 may represent any personal or business notebook computer. Mobile device 112 may represent advanced phones (e.g., smartphone), Voice over Internet Protocol (VoIP) telephones, mobile phones, tablet, personal digital or data assistants, or other appropriate portable computing device. Endpoint devices coupled to communications network 102 may include wired or wireless devices. Other suitable endpoint devices include, but are not limited to, workstations, laptops or notebook computer systems, printers, Voice over Internet Protocol (VoIP) telephones, IP phones, mobile telephones, advanced phones (e.g., smartphones), personal digital assistants (PDAs), wireless handsets, notebook computer systems, tablet computer systems, embedded devices, auxiliary devices, or the like. In particular embodiments, endpoint devices 106 are capable of transmitting and receiving different forms of media including audio, video, images, text messages, and other data formats, and documents and accessing disparate network-based services. While system 100 depicts particular embodiments of endpoint devices as desktop computer 108, laptop computer 110, and mobile device 112, it should be understood that suitable embodiments may include any device that can be used to communicate across communications network 102, such as with cloud resource allocation server 104 and/or cloud server 106.

Particular embodiments are designed to operate in a network environment that provides a flexible testing environment using a cloud. In particular embodiments, this process may include receiving a request to allocate testing resources for a project and testing characteristics for the project, verifying the testing characteristics of the project, registering the project for testing using the verified testing characteristics, determining whether testing resources can be allocated based on the testing characteristics of the project and the available testing resources, and allocating testing resources based on the testing characteristics of the project and available resources. In particular embodiments, after testing of the project initiates using the allocated testing resources, the system may receive changes to the testing characteristics of the project and cause testing characteristics of the project to be updated. In response to such updates, the allocated testing resources may be adjusted based on the updated testing characteristics of the project. In some implementations, the testing characteristics of the project or requested allocation of testing resources may include a an amount of resources for testing that closely approximates the amount of resources found in a production environment for the project.

As an example use case, a developer using desktop computer 108 may choose to test a software project by accessing the cloud resource allocation server 104 over communications network 102. In response to specified testing characteristics and availability of testing resources, cloud resource allocation server 104 may allocate testing resources so that the software project can be tested according to its requirements. In some embodiments, testing requirements may simulate conditions in a live production environment for the software project. Cloud resource allocation sever 104 may receive changes to the testing characteristics of the project during the testing process through desktop computer 108 or some other device coupled to communication network 102, which may cause cloud resource allocation server 104 to dynamically adjust the allocation of testing resources to meet those changing requirements. In certain implementations, cloud resource allocation server 104 may communicate with cloud server 106 to assign, release, and manage the allocation of computing resources located on cloud server 106 and used for testing various projects. In other implementations, cloud resource allocation server 104 assign, release, and manage the allocation of computing resources located on cloud resource allocation server 104 and used for testing various projects. Systems, methods, and software described by example in the present disclosure may increase the efficiency, speed, and effectiveness of flexible testing across a network.

In operation, elements of system 100 operate together to perform various resource allocation functions including but not limited to maintaining a repository of testing activities on the network including information related projects and testing characteristics, verifying testing characteristics and registering projects for testing, allocating resources for testing based on available computing resources, and permitting the dynamic adjustment of allocated resources during the testing cycle. For example, in particular embodiments, elements of system 100 may allow a network user to effectively test a software project and adjust testing parameters during testing to efficiently and effectively troubleshoot issues and ensure compliance with project requirements. In certain embodiments, the interface provided by cloud resource allocation server 104 would be a web portal or application interface that may be accessible by a network user on desktop computer 108, laptop computer 110, and/or mobile device 112. In some implementations, a network user may request a certain allocation of testing resources for the software project and specify various testing characteristics. For example, a network user, such as a software developer, may cause desktop computer 108 to specify testing characteristics or parameters, such as the number of stages of testing for the project, the duration of testing in each of those stages, and the amount of computing resources required for testing during each stage. In certain implementations, elements of system 100 may allow the network user to adjust or modify testing characteristics at appropriate times to test a project in an environment that is similar to the live production environment for the project.

In particular embodiments, one or more endpoint devices, such as desktop computer 108, laptop computer 110, and mobile device 112, connect or seek access to cloud resource allocation server 104 to request access to computing resources provided by cloud server 106 communications network 102, for the purposes of testing one or more projects. For example, one of endpoint devices may request access to cloud resource allocation server 104 across communications network 102 through desktop computer 108. In doing so, certain embodiments may provide a user interface, such a web portal or application interface, to allow a network user to provide information about the project and the testing criteria. For example, in some embodiments, cloud resource allocation server 104 will provide an appropriate user interface for any endpoint device, such as desktop computer 108, laptop computer 110, and mobile device 112, to provide parameters associated with the requested testing, such as testing characteristics associated with testing a project. In certain implementations, testing characteristics specify the computing resources or other types of testing resources necessary to test one or more projects. For example, testing resources may include an amount of random access memory (RAM), a number central processing units (CPUs), hard disk memory, input or output (I/O) resources, or any combination thereof. In other implementations, testing characteristics can specify various stages involved in testing a project, the duration of each of those testing stages, and the quantity or amount of computing resources or other resources necessary in each of those testing stages.

In appropriate embodiments, once the testing characteristics have been verified, such as by another network user affiliated with a project or by a comparison with historical testing characteristics or other statistics associated with the project, the project to be tested may be registered with cloud resource allocation server 104. According to particular embodiments, cloud resource allocation server 104 may communicate with cloud server 106 to determine available resources and allocate resources for testing based on those available resources. Some embodiments of cloud resource allocation server 104 permit network users to receive changes to testing characteristics during testing (e.g., after testing has begun but before it has completed) and cause cloud resource allocation server 104 to dynamically adjust allocated resources for testing based on those changes or updated testing characteristics of the project. In certain implementations, cloud resource allocation server 104 may be able to accommodate testing under conditions (e.g., amount of resources) that is substantially similar to or closely approximates the expected conditions in a production environment for the project.

Components of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of system 100 and the components within system 100.

While system 100 is illustrated as including specific components arranged in a particular configuration, it should be understood that various embodiments may operate using any suitable arrangement and collection of components capable of providing functionality such as that described. For example, although system 100 is illustrated as including desktop computer 108, laptop computer 110, and mobile device 112, any device capable of providing an interface to the user may be coupled to network 102 and employed within the context of this disclosure. Thus, any suitable portable or fixed device employed in accordance with the teachings of the present disclosure. In addition, although cloud resource allocation server 104 and cloud server 106 are depicted as separate components, embodiments of the present disclosure may include systems where the functionality of both servers is provided by a single component or a distributed set of components.

FIG. 2 illustrates a system 200 as a particular embodiment of cloud resource allocation server that is capable of providing a flexible testing environment according to particular control logic. In a particular embodiment, system 200 represents a proprietary cloud resource allocation server that manages resource allocation to provide a flexible testing environment.

As illustrated, system 200 may include various interconnected elements including a memory 202, a processor 204, and an interface 206. Memory 202 stores, either permanently or temporarily, data, operational software, or other information for processor 204.

Memory 202 represents any suitable combination of volatile or non-volatile, local or remote devices suitable for storing information. For example, memory 202 may include RAM, ROM, solid state storage devices, magnetic storage devices, optical storage devices, or any other suitable information storage device or a combination of such devices. As illustrated, memory 202 includes a database 208, and application 210 to facilitate management of a flexible testing environment. Database 208 represents a relational database for storing and organizing various types of network information such as endpoint information, project testing information such as testing characteristics, information related to available resources for testing, rules and appropriate policies related to the allocation, release and management of resources for testing, historical or other statistical data related to testing projects, and contact information for network users associated with particular projects. In particular embodiments, database 208 may be any suitable database capable of organizing information.

Application 210 generally refers to logic, rules, algorithms, code, tables and/or other suitable instructions for performing the described functions and operations of system 200. In certain embodiments, application 210 may facilitate the interaction of system 200 with cloud server 106, desktop computer 108, laptop computer 110, and mobile device 112, using communications network 102.

Processor 204 represents one or more processing elements, including hardware, logic, and data capable of controlling the operation of system 200. For example, processor 204 may be a computer processor capable of executing a cloud resource allocation manager application stored in memory 202, or any other software or controlling logic associated with system 200, such as an appropriate operating system. According to particular embodiments, processor 204 may be a programmable logic device, a microcontroller, a microprocessor, any other appropriate processing device, or any suitable combination of the preceding.

Interface 206 represents any appropriate combination of hardware and controlling logic for coupling to one or more networks. Interface 206 may support any number of suitable protocols for communicating on a communication network. For example, network interface 206 may be a wired or wireless local area network interface, cellular network interface, satellite interface, and/or any other appropriate interface for communicating on a communication network. Interface 206 may have multiple interfaces for handling different communication protocols.

In operation, processor 204 interacts with interface 206 to receive a request for computing resources through communications network 102, for the purposes of testing one or more projects. In certain embodiments, that request may include to parameters associated with the requested project or testing, such as testing characteristics associated with testing the project. For example, testing characteristics specify the computing resources or other types of testing resources necessary to test one or more projects. In certain implementations, testing resources may include an amount of random access memory (RAM), a number central processing units (CPUs), an amount of hard disk memory, an amount of input or output (I/O) resources, or any combination thereof. In other implementations, testing characteristics can specify various stages involved in testing a project, the duration of each of those testing stages, and the quantity or amount of computing resources or other resources necessary in each of those testing stages.

System 200 may verify or confirm the accuracy of the testing characteristics, such as by another network user affiliated with a project or by a comparison with historical testing characteristics or other statistics associated with the project. Processor 204 may execute appropriate control logic as defined by application 210 to determine whether testing characteristics match expected, historical, or other statistical value or policies. As appropriate, processor 203 may consult database 208 to verify or confirm testing characteristics of one or more projects. Once verified, processor 204 may execute appropriate logic from application 210 to register a project for testing in database 208 to facilitate dynamic management and allocation of testing resources. In certain embodiments, appropriate control logic as defined by application 210 may be executed to dynamically allocate resources for testing one or more projects according to the particular testing characteristics of each project and available resources. Certain embodiments of system 200 are capable of receiving changes to testing characteristics during testing (e.g., after testing has begun but before it has completed) and database 208 to be updated such that processor 204 can execute appropriate logic in application 210 to dynamically adjust allocated resources for testing based on those changes or updated testing characteristics of the project. In certain implementations, system 200, through the execution of application 210 by processor 204, is capable of accommodating testing under conditions (e.g., amount of resources) that is substantially similar to or closely approximates the expected conditions in a production environment for the project.

In some embodiments, system 200 may communicate with other systems such as cloud server 106 to allocate, release, and otherwise manage resources for testing projects. For example, although in some embodiments, the amount of available resources may be known to system 200, other embodiments may need to query other systems such as cloud server 106 to determine available resources. In some embodiments, because system 200 permits dynamic resource allocation, it may communicate with systems such as cloud server 106 to activate dormant data servers in response to an increase in the allocated testing resources and/or deactivate data servers in response to a decrease in the allocated testing resources. For example, if a particular amount of testing resources for testing projects becomes necessary due to testing characteristics of registered projects or due to a new request for testing resources, system 200 may request that the allocated testing resources be increased either temporarily or permanently to accommodate the new resource requirements, which may include activating data servers, CPUs, RAM, hard disk memory, input or output (I/O), or other appropriate resources. In some implementations, authorization may be necessary before requesting additional resources, such as in the case of resources for testing supplied by third parties. In those implementations, once authorization is requested and obtained, additional testing resources may be requested to accommodate the requested allocation of testing resources. Similarly, if a particular amount of testing resources for testing projects no longer becomes necessary due to testing characteristics of registered projects, completion of testing of particular projects, or variations in actual use of testing resources, system 200 may request that the allocated testing resources be decreased either temporarily or permanently, which may include deactivating data servers, CPUs, RAM, hard disk memory, input or output (I/O) resources, or other appropriate resources.

Thus, system 200 represents an example cloud resource allocation server that is operable perform the functions of the present disclosure. While system 200 is illustrated as including specific components, it should be understood that various embodiments may operate using any suitable arrangement and collection of components. For example, the hardware and/or functionality of system 200 could be incorporated within a cloud server 106, or vice versa.

FIG. 3 is a process flow diagram illustrating process flow 300 for providing a flexible testing environment using a cloud infrastructure. The steps of process flow 300 correspond to an example sequence of steps for managing the allocation of resources in a flexible testing environment. A process like process flow 300 may be implemented on an appropriate system, such as a cloud resource allocation server.

In the illustration, process flow 300 includes a number of steps for registering projects for testing based on testing characteristics that have been verified, dynamically determining whether resources for testing are available, and allocating appropriate resources for testing a project based on the testing characteristics of the project and available resources for testing. In certain embodiments, appropriate policies may dictate whether, when, and how resource allocation may occur. For example, certain network policies may dictate whether requesting additional resources is authorized. For example, other network policies may dictate whether particular projects are permitted to dynamically modify testing characteristics during active testing. As shown, the process flow starts at step 302, includes a receive resource allocation and testing characteristics step 304, a verification step 306, a registration step 308, resource allocation decision step 310, a resource allocation step 312, a testing complete decision step 314, a receive testing characteristics changes step 316, an update testing characteristics step 318, an additional resource allocation decision step 320, a request additional resources step 322, and ends at step 324. This collection of steps may be performed, for example, on a server, such as cloud resource allocation server 104 or system 200, or cloud server 106.

In operation, process flow 300 starts at step 302. At step 304, the system may receive a request to allocate resources for testing and receive testing characteristics for a project. In certain embodiments, this step may be divided into two steps. In step 304, for example, the system may receive a request from a network user to allocate resources for testing a project, such a software project, before it is deployed in a live production environment. As discussed above, testing resources may include an amount of random access memory (RAM), a number central processing units (CPUs), an amount of hard disk memory, an amount of input or output (I/O) resources, or any combination thereof, required for testing one or more projects. Embodiments of the present disclosure may also permit testing characteristics associated with the project to be provided by a network user. Testing characteristics of a project may include a one or more stages of testing for a project where each stage of the plurality of stages is defined by the duration of testing in the stage and an amount of resources required for testing during that stage. In some embodiments, the testing characteristics of the project or requested allocation of resources may include a resource requirement for testing that is substantially similar or closely approximates resources used in a live production environment for the project. Network users may request allocation and provide testing characteristics using any appropriate endpoint device, such as desktop computer 108, laptop computer 110, or mobile device 112.

Next, process flow 300 continues to the verification step 304. In this step, the system confirms the accuracy of the received testing characteristics and/or the requested allocation of testing resources. In particular embodiments, a database may maintain network logs that include information about prior testing of the same or similar projects. In certain embodiments, consulting the database may require communicating over a communication network to another server. For example, the system may consult an appropriate database to determine the received testing characteristics and/or requested allocation comports with historical data, such as historical testing characteristics, or other statistics associated with the project or similar projects. In some embodiments, the system may maintain an average or median of the amount of resources used by a project or similar projects and the duration those resources are used, for example, in different stages of testing. The system may be able to compare requested values to these maintained values associated with the testing of a project or similar project to determine whether the requested values fall within an acceptable range. In other embodiments, another network user affiliated with a project may be contacted by the system to confirm whether the requested values are within an acceptable range, or whether they approve of the specified testing characteristics. Other verification techniques may also be employed without departing from the scope of the present disclosure.

At step 308, the system may then register the project for testing based on the verified allocation and/or testing characteristics of a project. In certain embodiments, this may cause the system to store these verified values in a database so that they can be referenced as necessary to allocate and release resources for testing. For example, the system may record the number of stages of testing, the duration of testing in each stage, and the amount of testing resources required for each stage of testing a project in a database.

Next, process flow 300 proceeds to resource allocation decision step 310. In resource allocation decision step 310, the system may determine whether testing resources can be allocated based on the testing characteristics of the project and available resources. In certain embodiments, this step may involve the system querying appropriate databases, systems, or other servers to determine whether resources are available to be allocated for a project or collection of projects. Once the available resources are determined, the system may compare the available resources against the testing resources specified by the testing characteristics of the project. If the resources can be allocated, process flow 300 proceeds to step 312. If, however, the resources cannot be allocated, process flow 300 proceeds to step 320.

Once process flow 300 reaches resource allocation step 312, then the system may have deemed that resources are available to be allocated. As a result, in step 312, the system may allocate testing resources based on the testing characteristics and available resources. In certain embodiments, step 312 may provide dynamic management of resources by activating dormant data servers in response to an increase in the allocated testing resources and/or deactivating data servers in response to a decrease in the allocated testing resources. In other embodiments, data storage devices may be activated or deactivated, as appropriate, to provide dynamic allocation of resources. Similarly, other types of testing resources may be made available or released to facilitate management of testing resources. In some embodiments, the system may determine that it can allocate resources for certain early stages of the testing associated with a particular project even though it cannot necessarily guarantee that resources can be allocated for later stages of testing. In that scenario, the system may allocate resources and permit testing of the project in those early stages with the anticipation that an appropriate amount of resources may be available for testing in later stages due to other projects completing testing or releasing unused resources. In other embodiments, if the various stages of testing a particular project are not dependent on each other and can be run independently of one another, but resources are not currently available for testing stages in the specific order provided to the system, the system may permit allocation and testing of stages out of order such that stages that may be less resource intensive may be allocated resources and tested. In some embodiments, testing of projects or testing of projects in particular stages of testing may be put on hold until resources become available or can be requested by the system. In this manner, the system may dynamically and intelligently allocate resources for testing a project that maximizes efficient use of available resources.

Next, the process flow proceeds to step 314. In testing complete decision step 314, the system determines whether testing of a project is complete. In some embodiments, step 314 may only test whether a stage of a testing a project is complete to accommodate the testing of other projects or particular testing stages of other projects. In this manner, the testing of projects may be multiplexed such that resource allocation is fair and that a small number of projects do not dominate the resources available for allocation. In other embodiments, the system may allow projects on occasion to request that a large amount of resources may be allocated for testing. For example, testing in an environment that closely approximates a production environment may require a larger number or amount of resources. Embodiments of the present disclosure may permit such testing at appropriate times and in a manner that does not significantly affect the testing of other projects. If testing is deemed complete, process flow then ends at step 324. If, however, testing has not completed, process flow 300 then proceeds to step 316.

In receiving testing characteristics changes step 316, the system may receive from a network user across a network changes to testing characteristics during the testing of a project. For example, while the first stage of testing of a project is still in progress, the system may receive changes from a network user to the amount of resources necessary in the second stage of testing of the project. The system may intelligently accept that change to determine whether that change can be accommodated. In certain embodiments, the ability to change testing characteristics during testing may be dictated by network or user policies. In alternative embodiments, changes may only be permitted to certain stages of testing, within a particular period of time after testing has begun, within a specific period of time before testing will be complete or within a specific period of time before the stage to which the change is to be applied is scheduled to take place.

Next, process flow 300 proceeds to update testing characteristics step 318. In step 318, the system may access a database to update the testing characteristics based on the received change. As explained above, appropriate policies, rules or permissions may determine whether testing characteristics may be updated. In some embodiments, verification of the changes to testing characteristics may be performed, for example as discussed in step 308, before testing characteristics may be updated in the system. If updated testing characteristics of the project are authorized and updated in step 318, then the process flow returns again to resource allocation decision step 310 so that the updated information can be used to recalibrate the resource allocation system.

As explained above with respect to resource allocation decision step 310, if the resources cannot be allocated in step 310, process flow 300 proceeds to step 320. In additional resource allocation decision step 320, the system may determine whether it can or should request additional resources from internal or external (e.g., third party) sources to accommodate testing for projects. In particular embodiments, the system may determine the cost of additional resources and compare it to the anticipated opportunity cost if a test is not completed in time to automatically determine whether additional testing resources should be requested. In those embodiments, the system may access appropriate databases to determine and compare those costs. In other embodiments, the system may request authorization from a network user (e.g., project manager or supervisor) to determine whether additional testing resources can or should be requested. For example, if the project to be tested is deemed to be a critical project, a determination may be made that additional resources can and should be requested. On the other hand, if the project to be tested is not critical, a determination may be made that additional resources should not be requested even if they can be requested. If the system determines that requesting additional testing resources is authorized, process flow 300 proceeds to step 322 where additional resources are requested using appropriate internal or external interfaces and continues to resource allocation step 312. On the other hand, if the system determines that requesting additional testing resources is not authorized, process flow 300 ends at step 324.

While flow chart 300 is illustrated as including specific steps arranged in a particular sequence, it should be understood that various embodiments may operate using any suitable arrangement and collection of steps capable of providing functionality such as that described. For example, embodiments of the present disclosure may be able to predict a future need for testing resources based on past and emerging patterns. Accordingly, modifications, additions, or omissions may be made to flow chart 300 as appropriate.

Although the present disclosure describes several embodiments, it should be understood that a myriad of changes, substitutions, and alterations can be made without departing from the spirit and scope of the invention as defined by the appended claims.

What is claimed is:

1. An apparatus, comprising:
a user interface configured to receive a request to allocate testing resources for a project over a network, and one or more testing characteristics specified by a user, wherein the one or more testing characteristics includes:
   a first testing stage associated with a first amount of testing resources; and
   a second testing stage associated with a second amount of testing resources;
a memory configured to store the request and the testing characteristics specified by the user;
a network interface configured to communicate with the network;
a processor communicatively coupled to the user interface, the memory, and the network interface, the processor configured to:
   receive the request to allocate testing resources for the project;
   receive the testing characteristics for the project, the testing characteristics comprising an amount of testing resources specified by the user for testing the project;
   verify the specified testing characteristics of the project, wherein verifying the specified testing characteristics of the project comprises:
      requesting confirmation from another user affiliated with the project;
      determining an amount of resources used by a previous project that uses at least some of the same type of testing resources as the testing resources specified by the user;
      comparing the amount of testing resources specified by the user to the amount resources used by the previous project; and
      determining the amount of testing resources specified by the user is within a predetermined range of the amount of resources used by the previous project;
   register, in the memory, the project for testing using the verified testing characteristics;
   determine available testing resources based on the verified testing characteristics of the project;
   determine that testing resources are available for the first testing stage and not available for the second testing stage;
   allocate testing resources for the first testing stage based on the verified testing characteristics of the project and available resources;
   initiate testing of the first testing stage using the allocated testing resources for the first testing stage;
   determine that testing resources have become available for the second testing stage after initiating testing of the first testing stage;
   allocate testing resources for the second testing stage;
   initiate testing of the second testing stage using the allocated testing resources for the second testing stage after initiating testing of the first stage;
   receive, during testing of the second testing stage, changes to the testing characteristics of the project;
   update, in the memory, the testing characteristics of the project based on the changes; and
   adjust the allocated testing resources for at least one of the first testing stage and the second testing stage based on the updated testing characteristics of the project.

2. The apparatus of claim 1, wherein the processor is further configured to determine the testing resources are unavailable, and responsive to the determination that testing resources are unavailable:
   determine whether requesting additional testing resources is authorized; and
   request, in response to said authorization, additional testing resources to accommodate the requested allocation of testing resources.

3. The apparatus of claim 1, wherein testing resources comprises at least one of an amount of random access memory (RAM), a number central processing units (CPUs), an amount of hard disk memory, and an amount of input or output (I/O) resources.

4. The apparatus of claim 1, wherein the testing characteristics of the project comprises a plurality of stages of testing for the project, a duration for each stage of the plurality of testing stages, and an amount of testing resources required for each stage of the plurality of testing stages.

5. The apparatus of claim 1, wherein adjusting allocated testing resources based on the updated testing characteristics of the project comprises activating dormant data servers in response to an increase in the allocated testing resources and deactivating data servers in response to a decrease in the allocated testing resources.

6. The apparatus of claim 1, wherein the testing characteristics of the project comprises an amount of testing resources that is the same as an expected amount of resources in a production environment for the project.

7. A method, comprising:
receiving a request to allocate testing resources for a project over a network;
receiving testing characteristics for the project, the testing characteristics comprising:
an amount of testing resources specified by a user for testing the project;
a first testing stage associated with a first amount of testing resources; and
a second testing stage associated with a second amount of testing resources;
verifying the specified testing characteristics of the project, wherein verifying the specified testing characteristics of the project comprises:
requesting confirmation from another user affiliated with the project;
determining an amount of resources used by a previous project that uses at least some of the same type of testing resources as the testing resources specified by the user;
comparing the amount of testing resources specified by the user to the amount resources used by the previous project; and
determining the amount of testing resources specified by the user is within a predetermined range of the amount of resources used by the previous project;
registering, in a memory, the project for testing using the verified testing characteristics;
determining available testing resources based on the verified testing characteristics of the project;
determining that testing resources are available for the first testing stage and not available for the second testing stage;
allocating testing resources for the first testing stage based on the verified testing characteristics of the project and available resources;
initiating testing of the first testing stage using the allocated testing resources for the first testing stage;
determining that testing resources have become available for the second testing stage after initiating testing of the first testing stage;
allocating testing resources for the second testing stage;
initiating testing of the second testing stage using the allocated testing resources for the second testing stage after initiating testing of the first stage;
receiving, during testing of the second testing stage, changes to the testing characteristics of the project;
updating, in the memory, the testing characteristics of the project based on the changes; and
adjusting the allocated testing resources for at least one of the first testing stage and the second testing stage based on the updated testing characteristics of the project.

8. The method of claim 7, further comprising determining the testing resources are unavailable, and responsive to the determination that testing resources are unavailable:
determining whether requesting additional testing resources is authorized; and
requesting, in response to said authorization, additional testing resources to accommodate the requested allocation of testing resources.

9. The method of claim 7, wherein testing resources comprises at least one of an amount of random access memory (RAM), a number central processing units (CPUs), an amount of hard disk memory, and an amount of input or output (I/O) resources.

10. The method of claim 7, wherein the testing characteristics of the project comprises a plurality of stages of testing for the project, a duration for each stage of the plurality of testing stages, and an amount of testing resources required for each stage of the plurality of testing stages.

11. The method of claim 7, wherein adjusting allocated testing resources based on the updated testing characteristics of the project comprises activating dormant data servers in response to an increase in the allocated testing resources and deactivating data servers in response to a decrease in the allocated testing resources.

12. The method of claim 7, wherein the testing characteristics of the project comprises an amount of testing resources that the same as an expected amount of resources in a production environment for the project.

13. An system, comprising:
a client device associated with a user and coupled to a network, the client device configured to request an allocation of resting resources for a project and provide one or more testing characteristics for testing the project;
a data server comprising a memory and a processor, the processor configured to:
receive the request to allocate testing resources for the project;
receive testing characteristics for the project, the testing characteristics comprising:
an amount of testing resources specified by a user for testing the project;
a first testing stage associated with a first amount of testing resources; and
a second testing stage associated with a second amount of testing resources;
verify the specified testing characteristics of the project, wherein verifying the specified testing characteristics of the project comprises:
requesting confirmation from another user affiliated with the project;
determining an amount of resources used by a previous project that uses at least some of the same type of testing resources as the testing resources specified by the user;
comparing the amount of testing resources specified by the user to the amount resources used by the previous project; and
determining the amount of testing resources specified by the user is within a predetermined range of the amount of resources used by the previous project;
register, in the memory, the project for testing using the verified testing characteristics;
determine available testing resources based on the verified testing characteristics of the project;
determine that testing resources are available for the first testing stage and not available for the second testing stage;
allocate testing resources for the first testing stage based on the verified testing characteristics of the project and available resources;

initiate testing of the first testing stage using the allocated testing resources for the first testing stage;

determine that testing resources have become available for the second testing stage after initiating testing of the first testing stage;

allocate testing resources for the second testing stage;

initiate testing of the second testing stage using the allocated testing resources for the second testing stage after initiating testing of the first stage;

receive, during testing of the second testing stage, changes to the testing characteristics of the project;

update, in the memory, the testing characteristics of the project based on the changes; and adjust the allocated testing resources for at least one of the first testing stage and the second testing stage based on the updated testing characteristics of the project.

14. The system of claim 13, wherein the processor is further configured to determine the testing resources are unavailable, and responsive to the determination that testing resources are unavailable:

determine whether requesting additional testing resources is authorized; and request, in response to said authorization, additional testing resources to accommodate the requested allocation of testing resources.

15. The system of claim 13, wherein the testing characteristics of the project comprises a plurality of stages of testing for the project, a duration for each stage of the plurality of testing stages, and an amount of testing resources required for each stage of the plurality of testing stages.

16. The system of claim 13, wherein adjusting allocated testing resources based on the updated testing characteristics of the project comprises activating dormant data servers in response to an increase in the allocated testing resources and deactivating data servers in response to a decrease in the allocated testing resources.

17. The system of claim 13, wherein the testing characteristics of the project comprises an amount of testing resources that is the same as an expected amount of resources in a production environment for the project.

* * * * *